Sept. 19, 1967   L. O. MESENHIMER   3,343,073
REGULATED DIRECT CURRENT POWER SUPPLY EMPLOYING AUXILIARY CELL
Filed July 13, 1964   2 Sheets-Sheet 1

INVENTOR.
LEE O. MESENHIMER
BY
*Willis L. Vary*
ATTORNEY

United States Patent Office 3,343,073
Patented Sept. 19, 1967

3,343,073
REGULATED DIRECT CURRENT POWER SUPPLY
EMPLOYING AUXILIARY CELL
Lee Orland Mesenhimer, Lakewood, Ohio, assignor to
Lorain Products Corporation, a corporation of Ohio
Filed July 13, 1964, Ser. No. 381,963
15 Claims. (Cl. 323—15)

ABSTRACT OF THE DISCLOSURE

A regulated power supply includes a main source of electromotive force and an auxiliary source of electromotive force serially connected to the main source. Semiconductor switches are employed to control the connections between a load and the main and auxiliary sources in accordance with the potential applied across the load. The auxiliary source may be connected in polarity aiding relationship, in which case, it is called an "end cell," or it may be connected in a polarity opposing relationship with respect to the main source, in which case, it is known as a counter electromotive force cell which is usually abbreviated C.E.M.F.

---

Accordingly, it is an object of this invention to provide an improved regulated direct current power supply.

Another object of this invention is to provide a regulated power supply employing solid state devices.

Yet another object of this invention is to provide a power supply employing auxiliary cells, a voltage sensing circuit, and transistors which are controlled by the voltage sensing circuit to selectively control the effective connection of the auxiliary cells relative to the main battery.

Still another object of this invention is to provide a closely regulated, direct current power supply employing a minimum of parts.

A further object of this invention is to provide a regulated, direct current power supply employing semiconductors which is economical to construct and reliable in operation.

Briefly, in accordance with aspects of this invention, I have provided a simplified regulated power supply in which semiconductors are employed to control the switching of auxiliary cells, such as end cells and C.E.M.F. cells, quickly and accurately to control the output potential of the power supply. These semiconductors may be switched in response to variations in the load voltage, or in the main battery potential. In accordance with other aspects of this invention, I have provided an arrangement whereby a transistor may be employed to connect either a C.E.M.F. cell or an end cell to a main battery in response to the operation of a voltage sensing circuit effectively senses the potential across the main battery. Also, I have provided means whereby the combination of a transistor and a diode may be employed accurately to control the switching in and out of a voltage regulated power supply of an end cell, or a group of end cells, in response to decreases in potential across the battery, which decreases are sensed by a control circuit that controls the conduction of the transistor and diode. In accordance with still further aspects of this invention, I have discovered that the combination of transistor and diode may be cascaded selectively to control groups of end cells accurately to control, in turn, the potential applied across the load, the conduction of the groups of transistors and diodes being selectively controlled by means of a voltage responsive circuit. In accordance with yet other aspects of this invention, I have provided means whereby C.E.M.F. cells may be connected in parallel with transistors, the conduction of the transistors being accurately controlled in response to the potential of the load connected to the C.E.M.F. cells such that the transistor is selectively rendered conducting and nonconducting to switch the C.E.M.F. cells out of and into circuit with the load, respectively. I have also provided an arrangement whereby groups of C.E.M.F. cells may be serially connected and each group connected in parallel with a separate transistor, the conductivity of which is controlled in accordance with the main battery potential. Advantageously, these groups of C.E.M.F. cells may be selectively connected into and shunted from the regulated power supply at different voltage levels by means of voltage responsive circuits.

These and various other objects and features of the invention will be more clearly understood from a reading of the detailed description of the invention in conjunction with the drawing in which.

Figure 1:
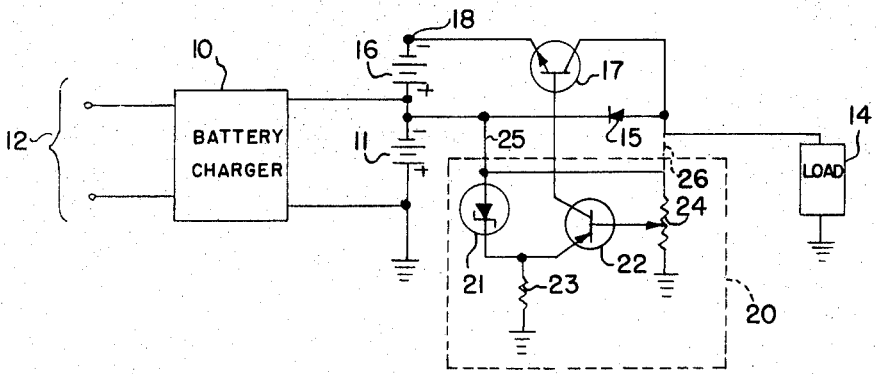
FIGURE 1 is a combined block and schematic diagram of one illustrative end cell type embodiment of this invention.

FIGURE 1 is a combined block and schematic diagram of a direct current, regulated power supply employing an end cell arrangement, which end cell is switched into and out of the circuit by means of semiconductors. As depicted in FIGURE 1, a battery charger 10 is connected across a main battery 11 to receive power from a pair of input terminals 12 to maintain the battery 11 charged and to supply current to a load 14 through a diode 15. If, however, as a result of power failure, the battery voltage falls, it is necessary to boost the voltage applied across the load from the battery 11 and this is accomplished by means of an end cell 16 connected in series aiding polarity with the main battery 11. End cell 16 is coupled to the load by the energization of a transistor 17, which transistor is serially connected between a terminal 18 of the end cell 16 and the load 14. The conduction of the transistor 17 is controlled by means of a voltage responsive control circuit 20 which is connected to the main battery 11, to ground, and to the base of transistor 17. When the transistor 17 conducts, the potential of the end cell 16 is applied across the diode 15 in a direction to back bias, or turn off, the diode 15 and thus preclude further conduction of the diode 15. The load is therefore effectively coupled across the series arrangement of battery 11 and battery 16 through the transistor 17. If the power supplied to the battery charger 10 from input terminals 12 is restored, the battery charger voltage is again applied across the battery 11 and causes the control circuit 20 to apply a base bias to the transistor 17 which effectively renders the transistor 17 nonconducting.

In this particular embodiment, the control circuit includes a Zener diode 21, a transistor 22 and a pair of resistors 23, 24. The anode of diode 21 is connected to the cathode of diode 15 and battery 11 by a conductor 25 for sensing the potential of battery 11. The transistor 22 has its emitter connected to the cathode of Zener diode 21 and the resistor 23 connects the emitter of transistor 22 to ground. Resistor 24 is variable and is connected between the anode of Zener diode 21 and ground with its variable tap connected to the base of transistor 22. The collector of transistor 22 is connected to the base of transistor 17 and transistor 22 controls the conduction of transistor 17 in accordance with the potential across the portion of resistor 24 between the variable tap and the Zener diode 21. The circuit including Zener diode 21 and resistor 23 maintains a constant voltage between the emitter of transistor 22 and the upper end of resistor 24. When the potential of main battery 11 falls, transistor 22 conducts and renders transistor 17 conducting. Similarly, if the potential of battery 11 rises, transistor 22 turns off, turning off transistor 17 and thereby removing the back bias on diode 15. Accordingly, diode 15 again conducts and the load current is supplied from battery 11 through diode 15. If it is desired to control the end cell 16 in accordance with load potential, conductor 25 is disconnected and a conductor 26, indicated in dotted line, is connected between the load 14 and variable resistor 24 and diode 21. The control circuit 20 will now control the conduction of transistor 17 in response to load potential in substantially the same manner as when responding to battery potential. Thus, the embodiment of FIGURE 1 quickly responds to a loss in power at the input terminals 12 of the battery charger 10 and responds to a restoration of the previously disconnected power to maintain a substantially constant potential across the load 14.

Figure 2:
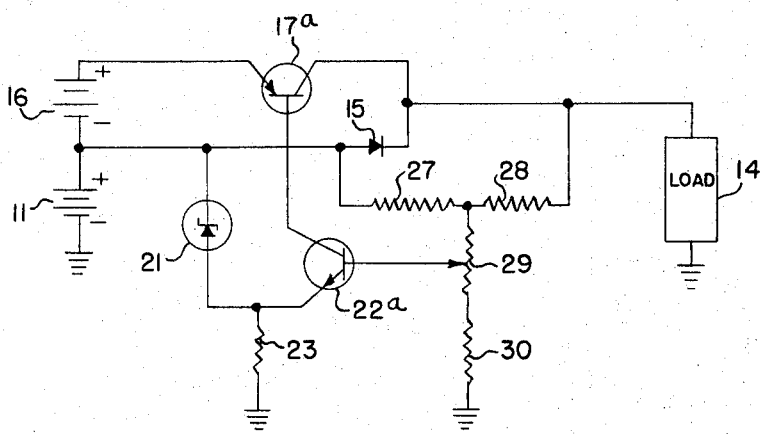
FIGURE 2 is a combined block and schematic diagrams of another illustrative end cell type embodiment of this invention.

FIGURE 2 is another modification of the arrangement of FIGURE 1 in which the polarities of the battery 11 and end cell 16 are reversed and in which feedback is provided to improve the transistor switching operation. In this embodiment, the polarities of the diode 15 and Zener diode 21 are reversed, a P.N.P. transistor 17a is substituted for N.P.N. transistor 17, and an N.P.N. transistor 22a is substituted for P.N.P. transistor 22. The base bias for transistor 22a is provided by a voltage divider network of resistors 27, 29 and 30 and a positive feedback resistor 28. This bias network is connected across the battery 11 and thus controls the switching of transistor 22a in accordance with battery potential. Positive feedback current through resistor 28 also flows through resistors 29 and 30 and improves the switching operation of transistor 22a which, in turn, improves the switching operation of transistor 17a.

Figure 3:
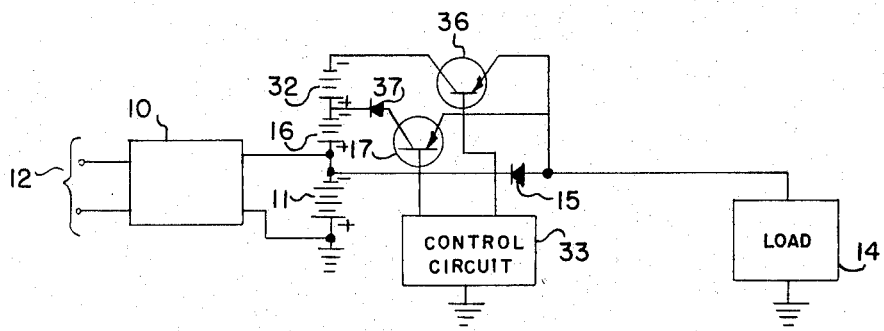
FIGURE 3 is a combined block and schematic diagram of still another illustrative end cell type embodiment of this invention.

FIGURE 3 shows a modified end cell arrangement in which the battery charger 10 receives input power at its input terminals 12 and supplies this power across the battery 11. Serially connected in series aiding polarity to the battery 11 are two groups of end cells 16, 32. The battery 11 is coupled to the load 14 through a diode 15 and the end cell 16 is controlled by means of a transistor 17 and the diode 15, the transistor 17 being under the control of control circuit 33. The end cell 32 is serially coupled through a transistor 36 to the load 14 and to the emitter and anode electrodes of transistor 17 and diode 15, respectively. The collector electrode of transistor 17 is coupled to cells 16 and 32 through diode 37. The operation of the circuit of FIGURE 3 is similar to that of FIGURE 1 except that further regulation is provided for compensating for decreases in the voltage of the battery 11 after the power fails to supply the battery charger 10.

When the voltage of the battery 11 is normal, the battery 11 supplies current through the diode 15 to the load 14. If the voltage supplied to the load is too low, the voltage responsive control circuit 33, which is similar to control circuit 20, renders the transistor 17 conducting by applying a forward bias to the base of transistor 17. When transistor 17 conducts, the end cell 16 is effectively connected to the load 14 through the diode 37 and the serially connected collector-emitter junctions of the transistor 17. The conduction of the transistor 17 causes the end cell 16 to back bias the diode 15 such that the serially connected battery 11 and cell 16 are effectively connected to the load 14 through the diode 37 and transistor 17. If the voltage of the battery decreases further so that the voltage supplied to the load is still too low, the control circuit 33 renders the transistor 36 conducting. When transistor 36 conducts, diodes 15 and 37 are reverse biased such that battery 11 is connected in series with end cells 16, 32 and current is supplied to the load 14 only through the transistor 36. If the power is restored to the input terminals 12, the battery charger 10 will cause the voltage of the battery 11 to rise, increasing the potential on the load. The control circuit 20 will turn off transistor 36 leaving transistor 17 turned on to reduce the load voltage. The load current will now be flowing from battery 11 and cell 16 through diode 37 and transistor 17. As the voltage of battery 11 rises further, the control circuit turns off transistor 17 and the entire system is now in its initial or normal condition.

Figure 4:
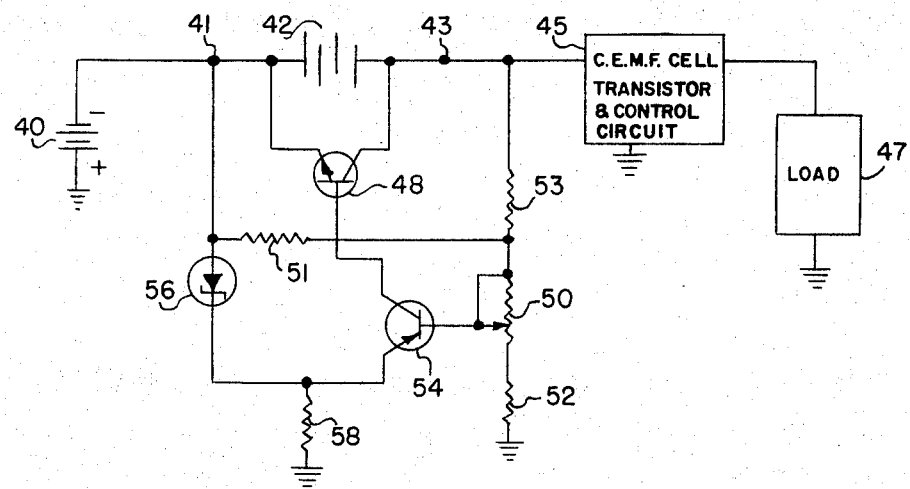
FIGURE 4 is a combined block and schematic diagram of another illustrative C.E.M.F. type embodiment of this invention.

FIGURE 4 shows a C.E.M.F. cell type of regulated voltage power supply in which power is supplied from a battery 40 and the battery 40 is connected to a terminal 41 of a C.E.M.F. cell 42. The opposite terminal 43 of the C.E.M.F. cell 42 is coupled through a network 45, which will be subsequently described, to a load 47. A transistor 48 is connected in parallel with the C.E.M.F. cell 42. This transistor is turned on or off by a voltage responsive network including a variable resistor 50 connected across the battery 40 by means of fixed resistors 51, 52; a positive feedback resistor 53; a transistor 54 having its collector electrode connected to the base of the transistor 48; its base electrode connected to the variable tap of resistor 50; a voltage responsive or breakdown diode 56 connected between the emitter of transistor 54 and terminal 41; and a resistor 58 connecting the emitter of transistor 54 to ground. The battery 40 normally "floats" across a battery charger, not shown. When the battery voltage is low, the load current from battery 40 is supplied through the collector-emitter circuit of the transistor 48 and through the network 45. If, however, the potential of battery 40 is greater than required to supply the load, then the voltage responsive circuit connected to the base of the transistor 48 renders the transistor 48 nonconductive thus connecting the C.E.M.F. cell 42 in series opposition with the battery 40 and thereby reducing the potential applied through the network 45 to the load 47. The resistors 50, 51 and 52 are effectively a voltage divider connected across the battery 40 and the potential applied between the base and emitter electrodes of transistor 54 is determined by the difference between this fraction of the battery voltage and the voltage of the breakdown diode 56 in the emitter circuit of transistor 54. If the voltage across the battery 40 rises due to any of a number of conditions, such as an increased output from the battery charger, not shown, or a decrease in the load 47, the bias applied to the transistor 54 is decreased and current flows through the transistor 54 and the resistor 58 to effectively turn off or render nonconducting the transistor 48. When transistor 48 ceases to conduct, battery 40 and C.E.M.F. cell 42 are effectively connected in series with the load 47. If for any reason the potential across the battery 40 again decreases, then the current through the resistor 50 decreases and the transistor 54 is effectively rendered nonconducting such that the transistor 48 again conducts and effectively short circuits the C.E.M.F. cell 42. The network 45 is a C.E.M.F. cell, shunting transistor and voltage responsive transistor biasing network which is identical to the C.E.M.F. cell 42, the transistor 48, and its associated biasing circuit. It will be understood that the invention may be practical without incorporation of the second voltage responsive network 45. Additionally, more than one circuit 45 may be used. The principal distinction between the network 45 and that network including the C.E.M.F. cell 42 would be that the voltage dividing resistor corresponding to the resistor 50 would be set to switch the transistor corresponding to transistor 54 at a slightly higher voltage than that at which transistor 54 switches.

Figure 5:
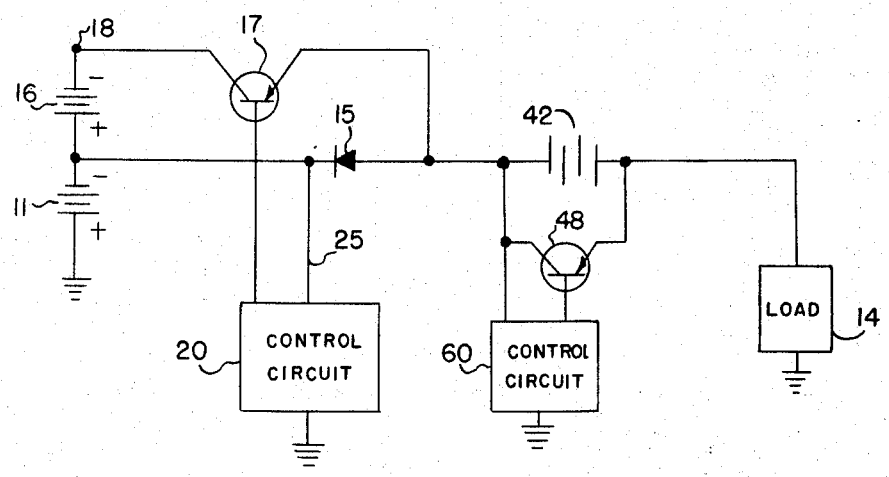
FIGURE 5 is a combined schematic and block diagram of a combined end cell and C.E.M.F. cell embodiment of the invention.

FIGURE 5 is a combination of the end cell power supply of FIGURE 1 employing the conductor 25 to sense the output potential and a single C.E.M.F. cell arrangement of the type shown in FIGURE 4. This embodiment provides regualtion of battery voltages above and below a predetermined value. When the potential of battery 11 falls below the predetermined value, control circuit 20 renders transistor 17 conducting, which reverse biases diode 15. If the potential of battery 11 rises to the predetermined value, control circuit 20 turns off transistor 17 thereby removing the back bias on diode 15 and battery 11 now supplies current through diode 15 and transistor 48 to the load 14. If the output potential of the above circuit is greater than a predetermined value, a control circuit 60, corresponding to the control circuit for transistor 48 of FIGURE 4, turns off transistor 48 thereby effectively inserting C.E.M.F. cell 42 in series with load 14. If the potential at the collector of transistor 48 decreases to the last-named predetermined value, control circuit 60 renders the transistor 48 conducting and load current is again supplied through transistor 48.

While I have shown and described five embodiments of this invention, it is understood that the concepts thereof may be employed in other embodiments without departing from the spirit and scope of this invention. It is understood that battery chargers, such as charger 10, may be employed with each of the embodiments and may also be connected to maintain a trickle charge through the end cells such as cells 16 and 32. The preferred embodiments include those in which the cell controlling switching transistors, such as 17, 36, and 48, have their emitters connected toward the direct current source and their collectors connected toward the load. Further, although either load potential or source potential may be employed to actuate the control circuits in each of these embodiments, the latter is preferred because it produces better control. Still further, those C.E.M.F. cell embodiments employing feedback are preferred because of the more positive switching operation obtained. It is yet further understood that battery polarities, diode polarities, and types of transistors may be interchanged and that the predetermined regulated potential may be manually adjusted by means of variable resistors in the control circuits such as variable resistors 24, 29 and 50.

What is claimed is:
1. A regulated, direct current power supply comprising:
   a main direct current source having a pair of terminals;
   a second direct current source having a pair of terminals with one terminal connected to one terminal of said main source;
   a load;
   impedance means connected between said main source and said load; and
   semiconductor switching means connected to both terminals of said second source and to said load for controlling the effective connection of said second source to said load.

2. A regulated, direct current power supply comprising:
   a main direct current source having a pair of terminals;
   a voltage modifying means including a second direct current source having a pair of terminals with one terminal connected to said main source;
   a load;
   impedance means connected between said main source and said load; and
   semiconductor switching means coupled to both terminals of said voltage modifying means and to said load for controlling the effective connection of said second source to said load.

3. A regulated power supply comprising:
   a main source of potential;
   a load;
   a unilateral impedance serially connected between said source and said load;
   voltage controlling means including an auxiliary source of potential connected in series with said main source; and
   switching means including a semiconductor serially connected between said auxiliary source and said load and means for controlling the conductivity of said serially connected semiconductor.

4. A regulated power supply comprising:
   a main source of potential;
   a load;
   a unilateral impedance serially connected between said source and said load;
   a voltage controlling means including a source of electromotive force connected in series with said main source; and
   switching means including a semiconductor serially connected to said source of electromotive force and to said load and voltage responsive means for controlling the conductivity of said semiconductor.

5. In a regulated power supply, the combination comprising:
   a main battery;
   a load;
   unilateral impedance means coupled between said main battery and said load;
   a cell connected in series aiding relationship to said main battery; and
   switching means including a semiconductor coupled between said cell and said load and including a voltage responsive circuit for selectively gating said semiconductor in accordance with the main battery potential.

6. In a regulated power supply, the combination comprising:
   a main battery;
   a load;
   unidirectional conductive means coupled between said main battery and said load;
   a cell connected in series aiding relationship to said main battery; and
   switching means including a semiconductor coupled between said cell and said load and including a voltage responsive circuit for selectively gating said semiconductor in accordance with load potential.

7. In a regulated power supply, the combination comprising:
   a main battery having a pair of terminals;
   a load;
   diode means coupled between said main battery and said load;
   a voltage modifying cell serially connected to said main battery in polarity aiding relationship;
   a semiconductor serially connected between said cell and said load; and
   control means coupled to said semiconductor and to said battery for gating said semiconductor in accordance with the potential across said battery.

8. In a regulated power supply, the combination comprising:
   a main battery;

a first and a second voltage modifying cell serially connected in that order to said main battery;
a load;
a diode connected between said load and said main battery;
a serially connected diode and a first semiconductor connected between said first and said second cells and said load;
a second semiconductor connected between said second cell and said load; and
voltage responsive control circuit means connected to each of said semiconductors for controlling the conductivity of said semiconductors.

9. In a regulated power supply, the combination comprising:
a main direct current source;
a voltage modifying cell connected in polarity opposition to said main source; impedance means connected in parallel with said cell;
a load connected to said cell; and
semiconductor means coupled in parallel with said cell and including
a semiconductor having at least two electrodes, each coupled to one of the terminals of said cell, and
potential responsive means for controlling the conductivity of said semiconductor.

10. In a regulated power supply, the combination comprising:
a direct current source;
a voltage modifying cell serially connected in polarity opposition to said source;
a load connected to said cell;
a semiconductor device connected in parallel with said cell; and
voltage responsive means for controlling the conductivity of said semiconductor device including
first resistance means connected in parallel with said source,
a transistor having one electrode connected to said first resistance means, a second electrode connected to said semiconductor, and a third electrode,
reference voltage means connected between said third electrode and said source,
second resistance means coupled between said source and said reference voltage means,
third resistance means connected in parallel with said cell and a portion of said first resistance means.

11. In a regulated power supply, the combination comprising:
a direct current source;
a counter electromotive force cell connected to said source;
a load connected to said cell;
a semiconductor having at least a collector, an emitter, and a base and having its emitter and collector electrodes each connected to one terminal of said cell; and
voltage responsive means connected to the base of said semiconductor for controlling the conductivity of said semiconductor, said voltage responsive means including
first resistance means connected across said source,
a transistor having one electrode connected to said resistance means and one electrode connected to said semiconductor,
reference voltage means connected between one electrode of said transistor and said source,
second resistance means connected between one terminal of the source and one electrode of said transistor, and
positive feedback means connected between said load and said first resistance means.

12. In a regulated power supply, the combination comprising:
a main direct current source;
a first voltage modifying cell serially connected in polarity aiding relationship to said main source;
a load;
unidirectional conductive means and a second voltage modifying cell serially connected between said main source and said load, said second cell being connected in polarity opposition to said source;
a first semiconductor serially connected between said first and said second cells;
a second semiconductor connected in parallel with said second cell;
first voltage responsive control means connected to said unidirectional conductive means and to said first semiconductor; and
second voltage responsive control means coupled to said second semiconductor.

13. In a regulated power supply, the combination comprising:
a main direct current source;
a first voltage modifying cell serially connected in polarity aiding relationship to said main source;
a load;
unidirectional conductive means and a second voltage modifying cell serially connected between said main source and said load, said second cell being connected in polarity opposition to said source;
a first semiconductor serially connected between said first and said second cells;
a second semiconductor connected in parallel with said second cell;
first voltage responsive control means connected to said unidirectional conductive means and to said first semiconductor; and
second voltage responsive control means connected to said second semiconductor and including
first resistance means connected to said main source,
a third semiconductor having one electrode connected to said first semiconductor and another electrode connected to said first resistance means,
second resistance means connected between said source and said third semiconductor, and
reference voltage means connected between said third semiconductor and one terminal of said main source.

14. In a regulated power supply, the combination comprising:
a main direct current source;
a first cell serially connected in polarity aiding relationship to said main source;
a load;
unidirectional conductive means and a second cell serially connected between said main source and said load in polarity opposing relationship;
a first semiconductor serially connected between said first and said second cells;
a second semiconductor connected in parallel with said second cell;
first control means connected to said first semiconductor for controlling the conductivity of said first semiconductor; and
second control means coupled to said second semiconductor for controlling the conductivity thereof.

15. In a regulated power supply, the combination comprising:
a main direct current source;
a first cell serially connected in polarity aiding relationship to said main source;
a load;
unidirectional conductive means and a counter electromotive force cell serially connected between said main source and said load;
a first semiconductor serially connected between said first and said second cells;
a second semiconductor connected in parallel with said counter electromotive force cell;
first voltage responsive control means connected to said first semiconductor for controlling the conductivity of said first semiconductor; and
second voltage responsive control means coupled to said second semiconductor for controlling the conductivity thereof.

References Cited

UNITED STATES PATENTS

| Re. 24,671 | 7/1959 | Jensen | 323—22 |
| 2,816,262 | 12/1957 | Elliott | 323—15 |
| 3,040,239 | 6/1962 | Walker | 323—24 |
| 3,195,036 | 7/1965 | McNulty | 321—16 |
| 3,263,157 | 7/1966 | Klein | 323—22 |
| 3,273,044 | 9/1966 | Clarke | 321—18 |

FOREIGN PATENTS 153,084 6/1951 Australia.

JOHN F. COUCH, *Primary Examiner.*

K. D. MOORE, W. E. RAY, *Assistant Examiners.*